July 29, 1958 — G. B. STILLWAGON, JR — 2,844,949
PINNING CONSTRUCTION FOR UNIVERSAL JOINT
Filed May 5, 1955
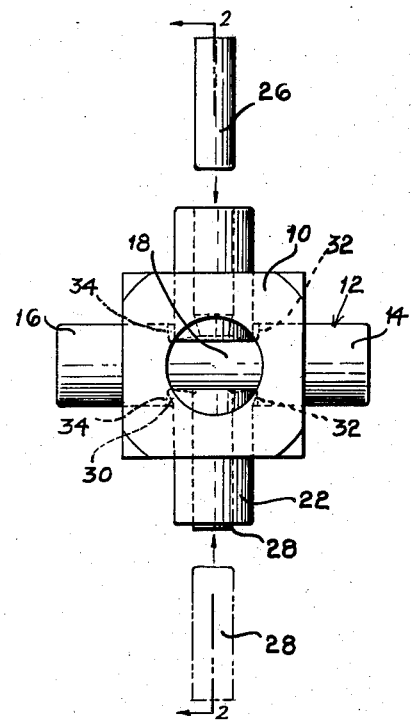
FIG. 1
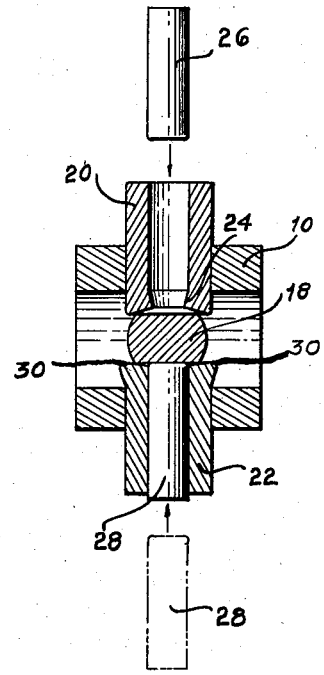
FIG. 2
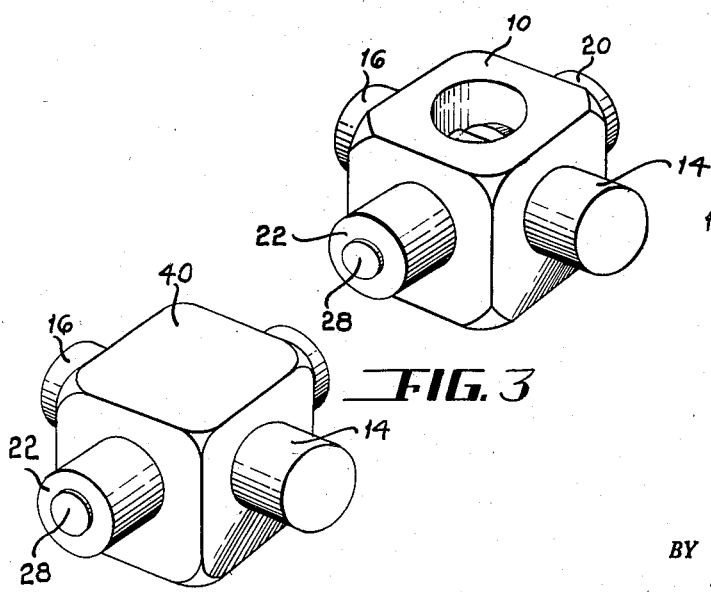
FIG. 3
FIG. 4
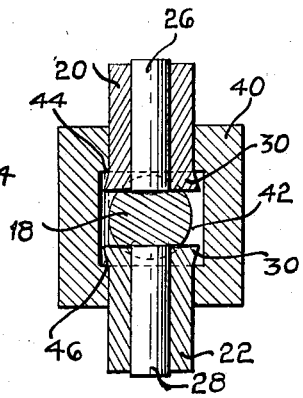
FIG. 5
INVENTOR.
GEORGE B. STILLWAGON JR.
BY
HIS ATTORNEYS

United States Patent Office 2,844,949
Patented July 29, 1958

2,844,949

PINNING CONSTRUCTION FOR UNIVERSAL JOINT

George B. Stillwagon, Jr., Dayton, Ohio, assignor of one-half to Kenneth G. Fraser, Dayton, Ohio Application May 5, 1955, Serial No. 506,240

4 Claims. (Cl. 64—17)

This invention relates to pinning construction for universal joints, and more particularly to a pinning construction, and the method of making it, which involves an absolute minimum of parts, and which provides a durable and permanent joint.

An object of this invention is to provide a pinning construction wherein the pins are locked into position by a swaging operation.

A further object of this invention is the provision of a pinning construction which is easily and simply made and wherein the elements are locked into position, and are permanently retained.

Other objects and advantages reside in the construction of parts, the combination thereof and the mode of operation, as will become more apparent from the following description.

Figure 1 is a top plan view.

Figure 2 is a vertical cross section taken on the line 2—2 of Figure 1.

Figure 3 is a perspective view.

Figure 4 is a perspective view of a modified form of the invention; and

Figure 5 is a cross sectional view.

In describing this device, it has been found expedient to designate one portion as "the top" and to describe the remaining portions of the device relative thereto. It is to be understood, however, that the block and arms of this device may be used in any position deemed desirable, and the invention is in no way limited to any one position.

Referring more in detail to the drawing, a block 10 is used in supporting the pins which engage the yokes of a universal joint. This block is provided with a pair of borings, normally placed with reference to each other. A pin 12 is formed with arms 14 and 16, circular in cross section. It is also provided with an intermediate flattened portion on two surfaces thereof. The two flattened portions are located on opposite sides and lie in parallel planes. The pin 12 is inserted through one of the borings in the block, with arms protruding from opposite faces thereof. A pair of hollow substantially cylindrical arms are inserted into the remaining boring from opposite sides of the block 10, and are secured in place by swaging.

Before this process has taken place, the arms have the form shown at 20 in Figure 2. The hollow arm 20 has been machined so as to have a cylindrical bored portion merging into a tapered portion so that the inner ends are thickened to form an inward, annular, thickened lip portion 24.

The swage tool or pin 26 has an outer diameter such as to allow snug fitting into the cylindrical portion of the bore in the arm 20. The tool is then swaged inwardly into the tapered portion of the bore, enlarging it, and expanding the metal of the tapered portion of the bore outwardly. The operation is shown in process in the upper portion of Figure 2. The completion of the process is shown in the lower portion of Figure 2. A swage tool or pin 28 is swaged inwardly into the boring in the arm 22, in the same manner as described above. The thickened lips are forced outwardly to become annular heads, which are larger in diameter than the boring in the block 10. The thickened portion is located between the flattened portion 18 of the pin 12, and the transverse bore. A permanent attachment is thus formed. The flattened portion 18 receives the impact of the swaging pressure. The thickened portion 30 will also engage the shoulders 32 and 34 formed on the pin 12, so that lateral movement of the pin 12 is prevented. It will thus be seen that the two arms 20 and 22 are permanently attached to the block, and at the same time, the pin 12 is secured against detachment.

In the modification shown in Figures 4 and 5 a modified form of block is used. In all other respects, this form is identical with the form of the invention described above as related to Figures 1, 2 and 3.

There is no recess in the block 40 which is comparable to the recess in the top of the block 10. The block 40 is provided with normally positioned borings which are enlarged at the center of the block. The enlarged portions form a recess 42 which allows for the outward expansion of the outwardly swaged portions 30. The recess also provides shoulders 44 and 46 which act as stops to prevent the expanded portions 30 from becoming disengaged from the block 40.

In all other respects, the pin and arm construction is identical with that shown in Figures 1, 2 and 3, and described above in relation thereto.

Although the preferred embodiment of the device has been described, it will be understood that within the purview of this invention various changes may be made in the form, details, proportion and arrangement of parts, the combination thereof and mode of operation, which generally stated, consist in a device capable of carrying out the objects set forth, as disclosed and defined in the appended claims.

Having thus described my invention, I claim:

1. Pinning construction for a universal joint comprising a block having normally disposed borings, a pin positioned in one of said borings, said pin having a flattened mid-portion and adjacent shoulders, a pair of hollow cylindrical arms positioned in the ends of the remaining boring, radially outwardly projecting thickened portions on the inner ends of said arms, said thickened portions forming shoulders to prevent the release of said arms from said block, said shoulders also engaging the first named shoulders on said pin to prevent removal of said pin from said block, and means seated within the hollow portions of said arms holding said thickened portions in the radially outwardly projecting position.

2. A pinning construction for a universal joint comprising a block having normally disposed intersecting borings, a pin positioned in one of said borings, said pin having a flattened mid-portion and shoulders adjacent said flattened mid-portion, a pair of hollow cylindrical arms positioned in the ends of the remaining boring, thickened portions on the inner ends of said arms, a pair of cylindrical swaging tools, there being one said tool disposed in the hollow of each of said hollow cylindrical arms, said swaging tools displacing the thickened portions of said arms radially outwardly in said block, said thickened portions thereby forming shoulders for preventing the release of said arms from said block, said thickened portions also engaging the first named shoulders on said pin to prevent removal of said pin from said block.

3. A pinning construction for a universal joint comprising a block having normally disposed intersecting borings, a pin positioned in one of said borings, said pin having a flattened mid-portion and shoulders adjacent said flattened mid-portion, a pair of hollow cylindrical arms positioned in the ends of the remaining boring, thickened portions on the inner ends of said arms, a pair of cylindrical swaging tools, there being one said tool disposed in the hollow of each of said hollow cylindrical arms, said thickened portions projecting radially outwardly from said arms to form shoulders for preventing the release of said arms from said block, said thickened portions engaging the first named shoulders on said pin to prevent removal of said pin from said block, said thickened portions also compressively engaging the swaging tools so as to retain the swaging tools in said arms.

4. A pinning construction for a universal joint comprising a block having two normally disposed intersecting borings, a solid pin positioned in one of said borings, said pin having a flattened mid-portion functioning as an anvil, and shoulders adjacent said flattened mid-portion, a pair of hollow cylindrical arms positioned in the ends of the remaining boring, said hollow cylindrical arms having thickened portions on the inner ends thereof, said thickened portions being seated on said flattened mid-portion, a pair of duo-functional cylindrical members having a diameter substantially equal to the maximum internal diameter of said hollow cylindrical arms, there being one of said duo-functional members disposed in the hollow of each of said cylindrical arms, said duo-functional members being seated in the thickened portions so as to hold the thickened portions radially outwardly from said arms to provide shoulders for preventing the release of said arms from said block, said duo-functional members reenforcing the hollow cylindrical arms, said thickened portions engaging said shoulders on said pin to prevent removal of said pin from said block, said thickened portions also compressively engaging the duo-functional members so as to retain said duo-functional members in said arms.

References Cited in the file of this patent

UNITED STATES PATENTS

| | | |
|---|---|---|
| 1,371,750 | Fox | Mar. 15, 1921 |
| 1,645,701 | Hopkins | Oct. 18, 1927 |
| 1,700,991 | Wintercorn | Feb. 5, 1929 |
| 2,369,810 | Stillwagon | Feb. 20, 1945 |
| 2,499,490 | Good | Mar. 7, 1950 |